(12) United States Patent
Wei et al.

(10) Patent No.: US 8,755,444 B2
(45) Date of Patent: Jun. 17, 2014

(54) TWO-STAGE ENTROPY DECODING

(75) Inventors: Jian Wei, San Diego, CA (US); Kai Wang, San Diego, CA (US); Toshiaki Yoshino, Fremont, CA (US)

(73) Assignee: Qualcomm Incorporated, San Diego, CA (US)

( * ) Notice: Subject to any disclaimer, the term of this patent is extended or adjusted under 35 U.S.C. 154(b) by 343 days.

(21) Appl. No.: 12/851,784

(22) Filed: Aug. 6, 2010

(65) Prior Publication Data

US 2012/0033742 A1 Feb. 9, 2012

(51) Int. Cl.
*H04N 7/26* (2006.01)
*H04N 7/50* (2006.01)

(52) U.S. Cl.
CPC ... *H04N 19/00472* (2013.01); *H04N 19/00503* (2013.01); *H04N 19/00951* (2013.01); *H04N 19/00781* (2013.01); *H04N 19/00533* (2013.01)
USPC ............ 375/240.25; 375/240.26; 375/240.27; 375/240.28; 375/240.29

(58) Field of Classification Search
USPC ........... 375/240.25, 240.26, E07.027, 240.13, 375/240.28; 709/231
IPC ..................................... H04N 7/12; H04B 1/66
See application file for complete search history.

(56) References Cited

U.S. PATENT DOCUMENTS

| | | | |
|---|---|---|---|
| 5,754,698 A | 5/1998 | Suzuki et al. | |
| 6,222,887 B1 * | 4/2001 | Nishikawa et al. | 375/240.26 |
| 6,927,710 B2 | 8/2005 | Linzer et al. | |
| 7,305,040 B1 | 12/2007 | Yoshinari et al. | |
| 2002/0061184 A1 | 5/2002 | Miyamoto | |
| 2003/0035649 A1 | 2/2003 | Chung et al. | |
| 2006/0147122 A1 | 7/2006 | Srinidhi | |
| 2006/0291570 A1 * | 12/2006 | Kitamura et al. | 375/240.28 |
| 2007/0188356 A1 | 8/2007 | Yokose et al. | |
| 2007/0223582 A1 | 9/2007 | Borer | |
| 2008/0165848 A1 * | 7/2008 | Ye et al. | 375/240.13 |
| 2009/0092326 A1 | 4/2009 | Fukuhara et al. | |
| 2009/0129481 A1 * | 5/2009 | MacInnis et al. | 375/240.25 |
| 2009/0238279 A1 * | 9/2009 | Tu et al. | 375/240.16 |
| 2010/0128801 A1 * | 5/2010 | Hashimoto | 375/240.25 |
| 2010/0189064 A1 * | 7/2010 | Raveendran | 370/329 |
| 2010/0191859 A1 * | 7/2010 | Raveendran | 709/231 |

FOREIGN PATENT DOCUMENTS

| | | | |
|---|---|---|---|
| EP | 1365591 A2 | 11/2003 | |
| JP | 2008289105 A | 11/2008 | |
| WO | 2007066121 A2 | 6/2007 | |

OTHER PUBLICATIONS

Demircin M U et al., "TE2: Compressed reference frame buffers (CRFB)", 2. JCT-VC Meeting; Jul. 21, 2010-Jul. 28, 2010; Geneva, No. JCTVC-B089, Jul. 20, 2010, XP030007669.

(Continued)

*Primary Examiner* — Thao X Le
*Assistant Examiner* — Long Le
(74) *Attorney, Agent, or Firm* — Brent A. Boyd

(57) ABSTRACT

The subject matter of this specification can be implemented in, among other things, a method of decoding video data that includes decoding compressed input video data using a first entropy coding technique to obtain first decoded data. The method further includes re-encoding the first decoded data using a second entropy coding technique that is different from the first entropy coding technique to obtain re-encoded data. The method further includes storing the re-encoded data in a storage device. The method further includes decoding the re-encoded data using the second entropy coding technique to obtain second decoded data.

20 Claims, 5 Drawing Sheets

(56) References Cited

OTHER PUBLICATIONS

International Search Report and Written Opinion—PCT/US2011/046816—ISA/EPO—Oct. 27, 2011.

Rizzo et al., "High Performance compression of Hyperspectral Imagery with Reduced Search Complexity in the Compressed Domain," Proceedings of the Data Compression Conference, Mar. 23-25, 2004, 11 pp.

* cited by examiner

TWO-STAGE ENTROPY DECODING

TECHNICAL FIELD

This disclosure relates to digital video coding and, more particularly, techniques for entropy decoding.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, video gaming devices, video game consoles, tablet computers, cellular or satellite radio telephones, and the like. Digital video devices implement video compression techniques, such as MPEG-2, MPEG-4, On2 VP6/VP7/VP8 coding, or ITU-T H.264/MPEG-4, Part 10, Advanced Video Coding (AVC), to transmit and receive digital video information more efficiently. Video compression techniques perform spatial prediction and temporal prediction to reduce or remove redundancy inherent in video sequences.

In video coding, video compression generally includes spatial prediction, motion estimation, and motion compensation. Intra-coding relies on spatial prediction to reduce or remove spatial redundancy between video blocks within a given coded unit, which may comprise a video frame, a slice of a video frame, a group of pictures, or another defined unit of video. Inter-coding relies on temporal prediction to reduce or remove temporal redundancy between video blocks of successive coded units of a video sequence. For intra-coding, a video encoder performs spatial prediction to compress data based on other data within the same coded unit. For inter-coding, the video encoder performs motion estimation and motion compensation to track the movement of corresponding video blocks between two or more adjacent coded units. Motion estimation generates motion vectors, which indicate the displacement of video blocks relative to corresponding prediction video blocks in one or more reference frames. Motion compensation uses the motion vectors to generate the prediction videos block from the reference frames. After motion compensation, a given residual video block is formed by subtracting the prediction video block from the original video block to be coded.

A coded video block may be represented by prediction information that can be used to create or identify a predictive block and a residual block of data indicative of differences between the block being coded and the predictive block. In the case of inter-coding, one or more motion vectors are used to identify the predictive block of data, while in the case of intra-coding, the prediction mode can be used to generate the predictive block. Both intra-coding and inter-coding may define several different prediction modes, which may define different block sizes and/or prediction techniques used in the coding. Additional types of syntax elements may also be included as part of encoded video data in order to control or define the coding techniques or parameters used in the coding process.

After block-based prediction coding, the video encoder may apply transform, quantization, and entropy coding processes to further reduce the bit rate associated with communication of a residual block. Transform techniques may comprise discrete cosine transforms or conceptually similar processes. Alternatively, wavelet transforms, integer transforms, or other types of transforms may be used. In a discrete cosine transform (DCT) process, as an example, the transform process converts a set of pixel values into transform coefficients, which may represent the energy of the pixel values in the frequency domain. Quantization is applied to the transform coefficients, and generally involves a process that limits the number of bits associated with any given transform coefficient. Entropy coding comprises one or more processes that collectively compress a sequence of quantized transform coefficients. Examples of entropy coding processes include arithmetic coding, content adaptive variable length coding (CAVLC), and context adaptive binary arithmetic coding (CABAC).

Regardless of the type of entropy coding used in the encoding process, a video decoder may perform inverse entropy coding operations to reconstruct the coefficients. The video decoder then inverse quantizes and inverse transforms the coefficients. The video decoder may decode the video information based on the motion information and residual information associated with video blocks in order to generate a decoded sequence of video information.

SUMMARY

In general, this disclosure describes two-stage entropy decoding techniques, which can be used in a video decoder that is capable of operating at high resolutions (e.g., 1920× 1080 at 60 frames per second) and high data rates (e.g., 80 megabits per second). In some implementations, the described techniques may be used to provide entropy video decoding, e.g., arithmetic decoding, in a manner that achieves a desirable balance between video decoder performance, data storage requirements, and/or device power requirements. The decoding techniques described herein, and particularly the data storage between the first and second stages, may also reduce the chances of a bottleneck occurring at any of the individual modules or components of the decoder.

According to this disclosure, the first stage of the two-stage entropy decoding techniques may be performed using a first type of entropy coding process such as, for example, arithmetic decoding, to decode compressed input video data. The first type of entropy coding may be a variable-rate coding process, the performance of which may depend on the bit rate of the input video data. For example, the performance of arithmetic entropy decoding is generally related to the bit rate of the compressed input video data that is to be decoded, which may vary dramatically from frame to frame, and even within the same frame.

The decoded data may then be re-encoded using a second type of entropy coding process such as, for example, dynamic Huffman encoding. The second type of entropy coding may be a substantially fixed-rate coding process, the performance of which may not depend on the bit rate of the input video data. The entropy re-encoding process compresses the size of the data before the re-encoded data is stored in an on-chip or off-chip memory. By compressing the size of the data before storage in on-chip memory, the size of the on-chip memory may be significantly reduced in some implementations. Similarly, in the case of off-chip storage, the amount of data that is transferred between the decoding unit and the off-chip memory may be significantly reduced based on the re-encoding of the data before transmission to the off-chip storage. This reduction in data traffic may correspondingly reduce the power requirements of the decoding device.

The second stage of the two-stage entropy decoding techniques may involve retrieving the re-encoded data from the on-chip or off-chip memory, and then decoding the re-encoded data using the second type of coding process, e.g., using a Huffman lookup table. As described above, the performance of the second stage of entropy decoding e.g., using the Huffman lookup table, may be relatively constant compared to the performance of the first entropy coding technique. As such, the second stage of entropy decoding may be implemented such that the performance of the second stage decoding substantially matches or is similar to the performance of pixel reconstruction, which is fixed for a given frame rate and resolution. In other words, the second stage entropy decoding processes operate at generally the same rate as the pixel reconstruction processes. This matching of operational performance between the second stage decoding and the pixel reconstruction may reduce or eliminate the use of storage between the entropy decoding process and the pixel reconstruction process while still allowing for smooth video playback. In general, the additional processing that results from separating the entropy decoding procedures into two stages is relatively minor, especially compared to the reduction in on-chip area used for storage and/or the power savings for the device when off-chip storage is used.

In one example, this disclosure provides a method of decoding video data. The method includes decoding compressed input video data using a first entropy coding technique to obtain first decoded data. The method also includes re-encoding the first decoded data using a second entropy coding technique that is different from the first entropy coding technique to obtain re-encoded data. The method further includes storing the re-encoded data in a storage device. The method also includes decoding the re-encoded data using the second entropy coding technique to obtain second decoded data.

In another example, this disclosure provides an apparatus configured to decode video data. The apparatus includes a first entropy decoding unit that decodes compressed input video data using a first entropy coding technique to obtain first decoded data. The apparatus also includes an entropy encoding unit that re-encodes the first decoded data using a second entropy coding technique that is different from the first entropy coding technique to obtain re-encoded data. The apparatus further includes a storage device that stores the re-encoded data. The apparatus also includes a second entropy decoding unit that decodes the re-encoded data using the second entropy coding technique to obtain second decoded data.

In another example, this disclosure provides a device that decodes video data. The device includes means for decoding compressed input video data using a first entropy coding technique to obtain first decoded data. The device also includes means for re-encoding the first decoded data using a second entropy coding technique that is different from the first entropy coding technique to obtain re-encoded data. The device further includes means for storing the re-encoded data in a storage device. The device also includes means for decoding the re-encoded data using the second entropy coding technique to obtain second decoded data.

In another example, this disclosure provides a device configured to decode video data. The device includes a first decoding stage comprising a first entropy decoding unit that decodes compressed input video data using a first entropy coding technique to obtain first decoded data, and an entropy encoding unit that re-encodes the first decoded data using a second entropy coding technique that is different from the first entropy coding technique to obtain re-encoded data. The device also includes a storage device that stores the re-encoded data. The device further includes a second decoding stage comprising a second entropy decoding unit that decodes the re-encoded data using the second entropy coding technique to obtain second decoded data.

The techniques described in this disclosure may be implemented in hardware, software, firmware, or any combination thereof. If implemented in hardware, an apparatus may be realized as an integrated circuit, a processor, discrete logic, or any combination thereof. If implemented in software, the software may be executed in one or more processors, such as a microprocessor, application specific integrated circuit (ASIC), field programmable gate array (FPGA), or digital signal processor (DSP). The software that executes the techniques may be initially stored in a computer-readable medium and loaded and executed in the processor.

Accordingly, this disclosure also contemplates a computer-readable storage medium comprising instructions that upon execution cause a processor to decode compressed input video data using a first entropy coding technique to obtain first decoded data. The instructions also cause the processor to re-encode the first decoded data using a second entropy coding technique that is different from the first entropy coding technique to obtain re-encoded data. The instructions further cause the processor to store the re-encoded data in a storage device. The instructions also cause the processor to decode the re-encoded data using the second entropy coding technique to obtain second decoded data. In some cases, the computer-readable medium may form part of a computer program product, which may be sold to manufactures and/or used in a video coding device.

The details of one or more aspects of the disclosure are set forth in the accompanying drawings and the description below. Other features, objects, and advantages of the techniques described in this disclosure will be apparent from the description and drawings, and from the claims.

BRIEF DESCRIPTION OF DRAWINGS

Like reference symbols in the various drawings indicate like elements.

DETAILED DESCRIPTION

Figure 1:
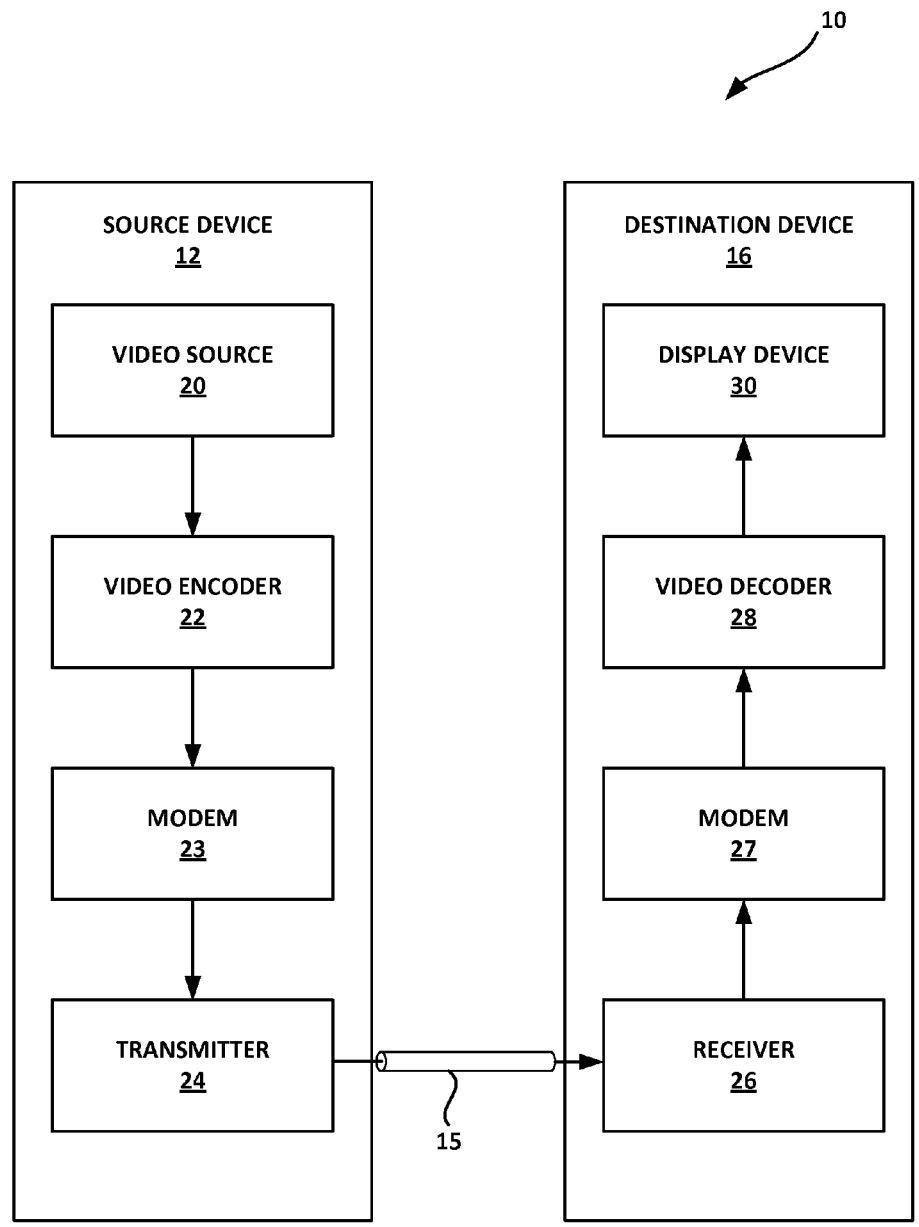
FIG. 1 is an exemplary block diagram illustrating a video encoding and decoding system.

To promote efficient entropy decoding, this disclosure describes, in various aspects, a decoding technique that is separated into two stages, with data storage (e.g., an on-chip bin buffer or off-chip data storage) between the two stages. The two stages may perform at different operational decoding rates, but the data store separating the two stages may reduce the likelihood of any of the various components of the decoder becoming a bottleneck in the decoding process.

According to this disclosure, the first stage may receive as an input compressed input video data that was encoded using a first type of entropy coding, such as arithmetic coding. An appropriate entropy decoder may then utilize the first type of entropy coding, e.g., arithmetic coding, to decode the compressed video data. This disclosure describes arithmetic coding as an example entropy coding technique, but it should be understood that the disclosure is not limited to arithmetic coding. Other examples of entropy coding techniques that are contemplated by this disclosure include, but are not limited to, content adaptive variable length coding (CAVLC), context adaptive binary arithmetic coding (CABAC), or other entropy coding methodologies. CABAC is one example of arithmetic coding consistent with this disclosure.

The performance of the entropy decoder in the first stage generally corresponds to the bit rate of the compressed input video data, which can vary dramatically from frame to frame, or even within the same frame. As used herein, the performance of the entropy decoder relates to the rate at which the decoder can decode the compressed input video data. In general, video data having a relatively higher bit rate may take longer to decode than video data having a relatively lower bit rate. As such, if the bit rate of the compressed input video data increases, the corresponding output of decoded video data decreases.

The first stage may also include an entropy encoder that utilizes a second type of entropy coding that is different from the first type of entropy coding. For example, after decoding the compressed video data, the decoded video data may be re-encoded using a different entropy coding process, such as a dynamic Huffman encoder, to compress the size of the video data to be stored in the data store between the first and second stages. In some implementations, the performance of the second type of entropy coding may be less variable than the performance of the first type of entropy coding.

The data store between the first and second stages may reduce the possibilities of a bottleneck occurring at any of the various components of the decoder. For example, because the performance of the entropy encoder of the first stage is variable depending on the bit rate of the input video data, it may operate at rates that are either faster or slower than the downstream pixel reconstruction processes, which operate at a fixed rate for a given frame rate and resolution. The data store allows the video data from the first entropy decoder to be stored for a period of time to create a buffer of consumable data such that the pixel reconstruction processes are not flooded with or starved for data.

The second stage may retrieve the re-encoded data from the data store between the first and second stages, and decode the re-encoded data using the second type of entropy coding, e.g., using a Huffman lookup table. The second stage of entropy decoding, e.g., using the Huffman lookup table, may be implemented such that the performance of the second stage decoding substantially matches or is similar to the performance of pixel reconstruction, which is generally fixed for a given frame rate and video resolution. In other words, the second stage entropy decoder may operate at generally the same speed as the downstream pixel reconstruction processes.

FIG. 1 is a block diagram illustrating one exemplary video encoding and decoding system 10 that may implement the techniques of this disclosure. As shown in FIG. 1, system 10 includes a source device 12 that transmits encoded video to a destination device 16 via a communication channel 15. Source device 12 and destination device 16 may comprise any of a wide range of devices. In some cases, source device 12 and destination device 16 comprise wireless communication devices, such as wireless handsets, so-called cellular or satellite radio telephones, or any wireless devices that can communicate video information over a communication channel 15, in which case communication channel 15 is wireless. The techniques of this disclosure, however, which relate to two-stage entropy decoding, are not necessarily limited to wireless applications or settings.

In the example of FIG. 1, source device 12 may include a video source 20, video encoder 22, a modulator/demodulator (modem) 23, and a transmitter 24. Destination device 16 may include a receiver 26, a modem 27, a video decoder 28, and a display device 30. In accordance with this disclosure, video encoder 22 of source device 12 may be configured to encode video data from video source 20 using a first type of entropy coding, such as arithmetic encoding. Similarly, video decoder 28 of destination device 16 may be configured to decode video data from video encoder 22 using the first type of entropy coding, such as arithmetic decoding.

In general, source device 12 generates coded video data for transmission to destination device 16. In some cases, however, devices 12, 16 may operate in a substantially symmetrical manner. For example, each of devices 12, 16 may include video encoding and decoding components. Hence, system 10 may support one-way or two-way video transmission between video devices 12, 16, e.g., for video streaming, video playback, video broadcasting, or video telephony.

Video source 20 of source device 12 may include a video capture device, such as a video camera, a video archive containing previously captured video, or a video feed from a video content provider. As a further alternative, video source 20 may generate computer graphics-based data as the source video, or a combination of live video, archived video, and computer-generated video. In some cases, if video source 20 is a video camera, source device 12 and destination device 16 may form so-called camera phones or video phones. In each case, the captured, pre-captured, or computer-generated video may be encoded by video encoder 22 using a first entropy coding technique. The encoded video information may then be modulated by modem 23 according to a communication standard, e.g., such as code division multiple access (CDMA) or another communication standard, and transmitted to destination device 16 via transmitter 24. Modem 23 may include various mixers, filters, amplifiers, or other components designed for signal modulation. Transmitter 24 may include circuits designed for transmitting data, including amplifiers, filters, and one or more antennas.

Receiver 26 of destination device 16 receives information over channel 15, and modem 27 demodulates the information. The video decoding process performed by video decoder 28 may perform inverse quantization in reconstructing the video sequence, such as by using the first entropy coding technique utilized by video encoder 22. According to this disclosure, video decoder 28 includes a two-stage decoder that performs the entropy decoding techniques described herein. Display device 30 displays the decoded video data to a user, and may comprise any of a variety of display devices such as a cathode ray tube, a liquid crystal display (LCD), a plasma display, an organic light emitting diode (OLED) display, or another type of display device.

In the example of FIG. 1, communication channel 15 may comprise any wireless or wired communication medium, such as a radio frequency (RF) spectrum or one or more physical transmission lines, or any combination of wireless and wired media. Communication channel 15 may form part of a packet-based network, such as a local area network, a wide-area network, or a global network such as the Internet. Communication channel 15 generally represents any suitable communication medium, or collection of different communication media, for transmitting video data from source device 12 to destination device 16.

Video encoder 22 and video decoder 28 may operate according to a video compression standard that supports arithmetic coding, CAVLC, CABAC, or another entropy coding methodology, such as the ITU-T H.264 standard, alternatively referred to as MPEG-4, Part 10, Advanced Video Coding (AVC). Although not shown in FIG. 1, in some aspects, video encoder 22 and video decoder 28 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

The ITU H.264/MPEG-4 (AVC) standard was formulated by the ITU-T Video Coding Experts Group (VCEG) together with the ISO/IEC Moving Picture Experts Group (MPEG) as the product of a collective partnership known as the Joint Video Team (JVT). In some aspects, the techniques described in this disclosure may be applied to devices that generally conform to the H.264 standard. The H.264 standard is described in ITU-T Recommendation H.264, Advanced Video Coding for generic audiovisual services, by the ITU-T Study Group, and dated March, 2005, which may be referred to herein as the H.264 standard or H.264 specification, or the H.264/AVC standard or specification. The Joint Video Team (JVT) continues to work extensions to H.264/MPEG-4 AVC.

Video encoder 22 and video decoder 28 each may be implemented as one or more microprocessors, digital signal processors (DSPs), application specific integrated circuits (ASICs), field programmable gate arrays (FPGAs), discrete logic, software, hardware, firmware, or any combinations thereof. Each of video encoder 22 and video decoder 28 may be included in one or more encoders or decoders, either of which may be integrated as part of a combined encoder/decoder (CODEC) in a respective mobile device, subscriber device, broadcast device, server, or the like.

Figure 2:
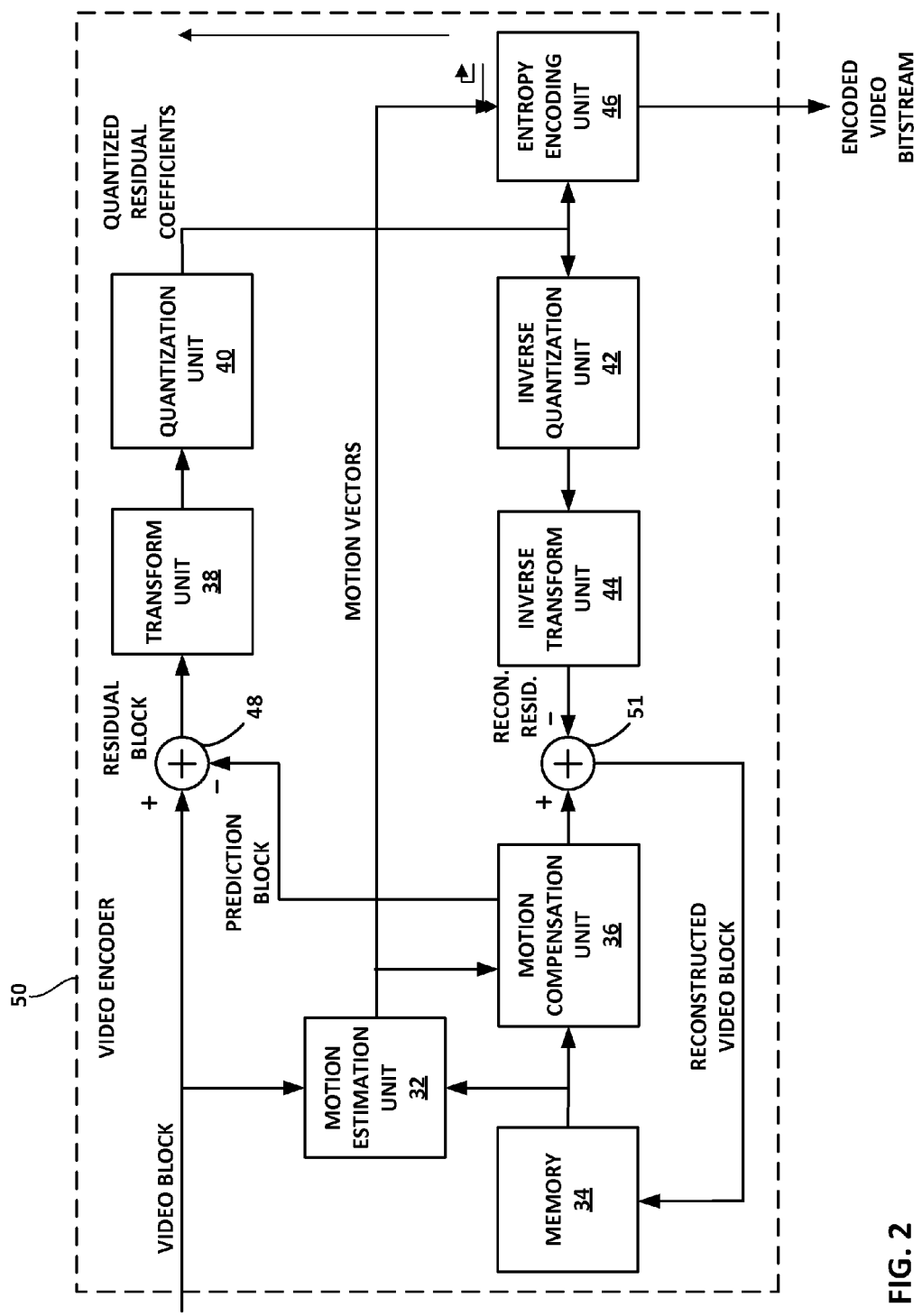
FIG. 2 is a block diagram illustrating an example of a video encoder consistent with this disclosure.

FIG. 2 is a block diagram illustrating an example of a video encoder 50 that includes an entropy encoding unit 46 that performs entropy encoding using a first entropy coding technique during the encoding process. Video encoder 50 may perform intra- and inter-coding of blocks within video frames. Intra-coding relies on spatial prediction to reduce or remove spatial redundancy in video within a given video frame. Inter-coding relies on temporal prediction to reduce or remove temporal redundancy in video within adjacent frames of a video sequence. For inter-coding, video encoder 50 performs motion estimation to track the movement of matching video blocks between two or more adjacent frames. Intra-mode (I-mode) may refer to the spatial based compression mode and Inter-modes such as prediction (P-mode) or bi-directional (B-mode) may refer to the temporal based compression modes.

As shown in FIG. 2, video encoder 50 receives a current video block within a video frame to be encoded. In the example of FIG. 2, video encoder 50 includes motion estimation unit 32, memory 34, motion compensation unit 36, block transform unit 38, quantization unit 40, inverse quantization unit 42, inverse transform unit 44, and entropy encoding unit 46. A deblocking filter (not shown) may also be included to filter block boundaries to remove blockiness artifacts. Video encoder 50 also includes summer 48 and summer 51. FIG. 2 illustrates the temporal prediction components of video encoder 50 for inter-coding of video blocks. Although not shown in FIG. 2 for ease of illustration, video encoder 50 also may include spatial prediction components for intra-coding of some video blocks.

Motion estimation unit 32 compares the video block to be encoded to various blocks in one or more adjacent video reference frames in order to determine one or more motion vectors. The adjacent frame or frames may be retrieved from memory 34, which may comprise any type of memory or data storage device to store video blocks reconstructed from previously encoded blocks. Motion estimation may be performed for blocks of variable sizes, e.g., 16×16, 16×8, 8×16, 8×8, or smaller block sizes. Motion estimation unit 32 identifies a block in an adjacent frame that most closely matches the current video block to be coded, and determines a displacement between the blocks. On this basis, motion estimation unit 32 produces a motion vector (MV) (or multiple MV's in the case of bidirectional prediction) that indicates the magnitude and trajectory of the displacement between the current video block and a predictive block used to code the current video block.

Motion vectors may have half- or quarter-pixel precision, or even finer precision, allowing video encoder 50 to track motion with higher precision than integer pixel locations and obtain a better prediction block. When motion vectors with fractional pixel values are used, interpolation operations are carried out in motion compensation unit 36. Motion estimation unit 32 identifies the desired motion vector for a video block, and using the resulting motion vector, motion compensation unit 36 forms a prediction video block by motion compensation.

Smaller video blocks can provide better resolution, and may be used for locations of a video frame that include high levels of detail. In general, macroblocks and the various sub-blocks or partitions may all be considered to be video blocks. In addition, a slice may be considered to be a series of video blocks, such as macroblocks and/or sub-blocks or partitions. In general a macroblock may refer to a set of chrominance and luminance values that define a 16 by 16 area of pixels. A luminance block may comprise a 16 by 16 set of values, but may be further partitioned into smaller video blocks, such as 8 by 8 blocks, 4 by 4 blocks, 8 by 4 blocks, 4 by 8 blocks or other sizes. Two different chrominance blocks may define color for the macroblock, and may each comprise 8 by 8 sub-sampled blocks of the color values associated with the 16 by 16 area of pixels. Macroblocks may include syntax information to define the coding modes and/or coding techniques applied to the macroblocks.

Macroblocks or other video blocks may be grouped into decodable units such as slices, frames or other independent units. Each slice may be an independently decodable unit of a video frame. Alternatively, frames themselves may be decodable units, or other portions of a frame may be defined as decodable units. In this disclosure, the term "coded unit" refers to any independently decodable unit of a video frame such as an entire frame, a slice of a frame, a group of pictures (GOPs), or another independently decodable unit defined according to the coding techniques used.

Video encoder 50 forms a residual video block by subtracting the prediction video block produced by motion compensation unit 36 from the original video block being coded. Summer 48 performs this subtraction operation. Block transform unit 38 applies a transform, such as a discrete cosine transform (DCT) or a conceptually similar transform, to the residual block, producing a video block comprising residual transform block coefficients. Block transform unit 38, for example, may perform other transforms defined by the H.264 standard, which are conceptually similar to DCT.

Quantization unit 40 quantizes the residual transform coefficients to further reduce bit rate. Quantization unit 40, for example, may limit the number of bits used to code each of the coefficients. After quantization, entropy encoding unit 46 encodes the quantized transform coefficients according to an entropy coding methodology, such as arithmetic encoding, CAVLC encoding, or CABAC encoding, to further compress the data.

Following the entropy coding by entropy encoding unit 46, the encoded video may be transmitted via an encoded video bitstream to another device or archived for later transmission or retrieval. Inverse quantization unit 42 and inverse transform unit 44 apply inverse quantization and inverse transformation, respectively, to reconstruct the residual block in the pixel domain for use as a reference block. Summer 51 adds the reconstructed residual block to the motion compensated prediction block produced by motion compensation unit 36 to produce a reconstructed video block for storage in memory 34. The reconstructed video block is used by motion estimation unit 32 and motion compensation unit 36 as a reference block to encode a block in a subsequent video frame.

Figure 3:
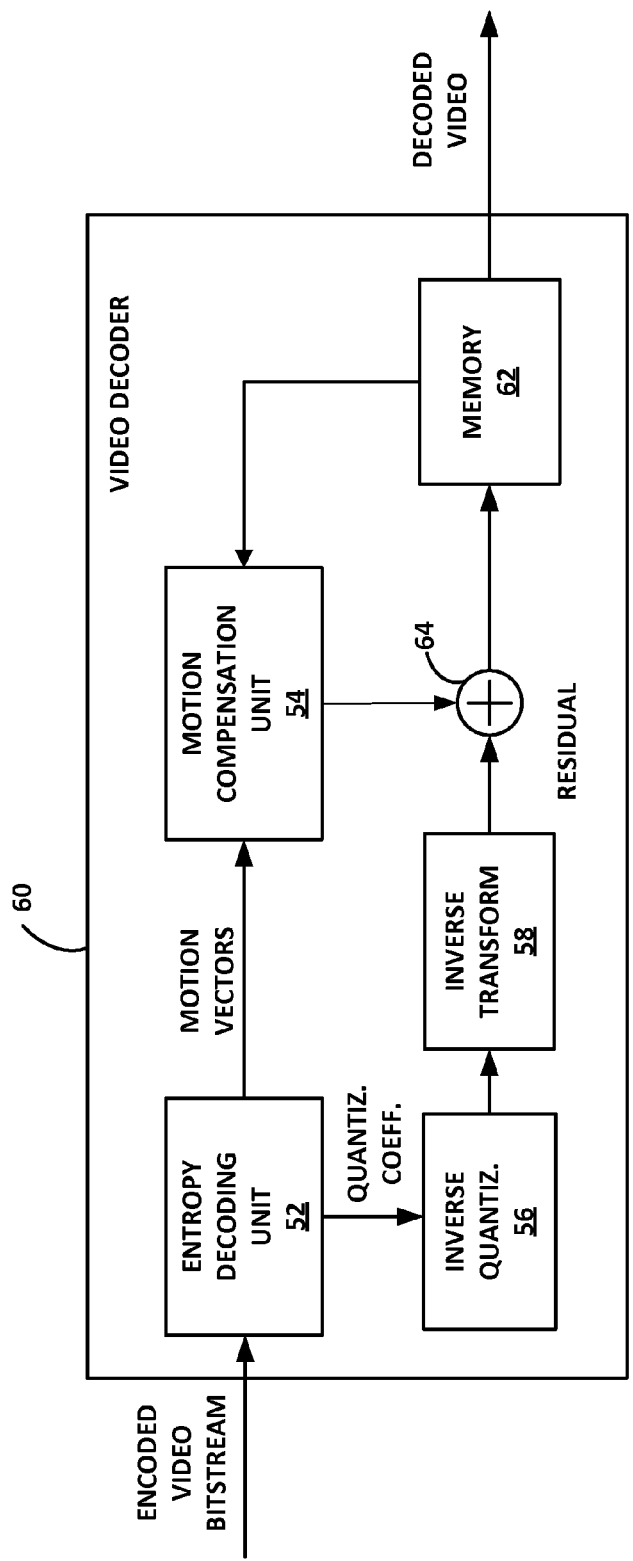
FIG. 3 is a block diagram illustrating an example of a video decoder consistent with this disclosure.

FIG. 3 is a block diagram illustrating an example of a video decoder 60, which decodes a video sequence that is encoded in the manner described herein. Video decoder 60 includes an entropy decoding unit 52 that performs the reciprocal decoding function of the encoding performed by entropy encoding unit 46 of FIG. 2. Video decoder 60 may perform intra- and inter-decoding of blocks within video frames. In the example of FIG. 3, video decoder 60 includes entropy decoding unit 52, motion compensation unit 54, inverse quantization unit 56, inverse transform unit 58, and memory 62. Video decoder 60 also includes summer 64. Optionally, video decoder 60 also may include a deblocking filter (not shown) that filters the output of summer 64. FIG. 3 illustrates the temporal prediction components of video decoder 60 for inter-decoding of video blocks. Although not shown in FIG. 3, video decoder 60 may also include spatial prediction components for intra-decoding of some video blocks.

As noted, entropy decoding unit 52 performs the reciprocal decoding function of the encoding performed by entropy encoding unit 46 of FIG. 2. For example, if entropy encoding unit 46 uses a particular coding methodology, such as arithmetic encoding, entropy decoding unit 52 may use the same coding methodology to decode the video data. According to this disclosure, the coding methodology used by entropy encoding unit 46 is also used in a first stage of entropy decoding unit 52, as described in greater detail below. Entropy decoding unit 52 also includes a second stage, which utilizes a coding methodology that is different from the coding methodology used by entropy encoding unit 46.

Entropy decoding unit 52 receives the encoded video bitstream that was output from entropy encoding unit 46 and decodes from the bitstream quantized residual coefficients and motion information, which may include motion vectors and block partitions. To decode quantized residual coefficients from the encoded bitstream that has been coded using arithmetic encoding, such as from the output of entropy encoding unit 46 of FIG. 2, entropy decoding unit 52 of FIG. 3 may perform arithmetic decoding of digital video block coefficients using known procedures. Regardless of the type of entropy coding used by entropy encoding unit 46, entropy decoding unit 52 may perform entropy decoding in an inverse manner relative to entropy encoding unit 46 in order to retrieve quantized block coefficients from the encoded bitstream.

Following the entropy decoding performed by entropy decoding unit 52, motion compensation unit 54 receives the motion vectors and one or more reconstructed reference frames from memory 62 to produce a prediction video block. As described above, the performance of entropy decoding unit 52 may be different than the performance of motion compensation unit 54 and other components involved in pixel reconstruction, which may cause a bottleneck in some circumstances. As described above, this bottleneck may be alleviated or minimized based on the data store between the two stages of the entropy decoding techniques described herein.

Inverse quantization unit 56 inverse quantizes, i.e., de-quantizes, the quantized block coefficients. The inverse quantization process may be a conventional process, such as H.264 decoding, for example. Inverse transform unit 58 applies an inverse transform, e.g., an inverse DCT or conceptually similar inverse transform process, to the transform coefficients in order to produce residual blocks in the pixel domain. Motion compensation unit 54 produces motion compensated blocks that are summed by summer 64 with the residual blocks to form decoded blocks. If desired, a deblocking filter may also be applied to filter the decoded blocks in order to remove blockiness artifacts. The filtered blocks are then placed in memory 62, which provides reference blocks for motion compensation and also produces decoded video for a display device (such as device 30 of FIG. 1).

Figure 4:
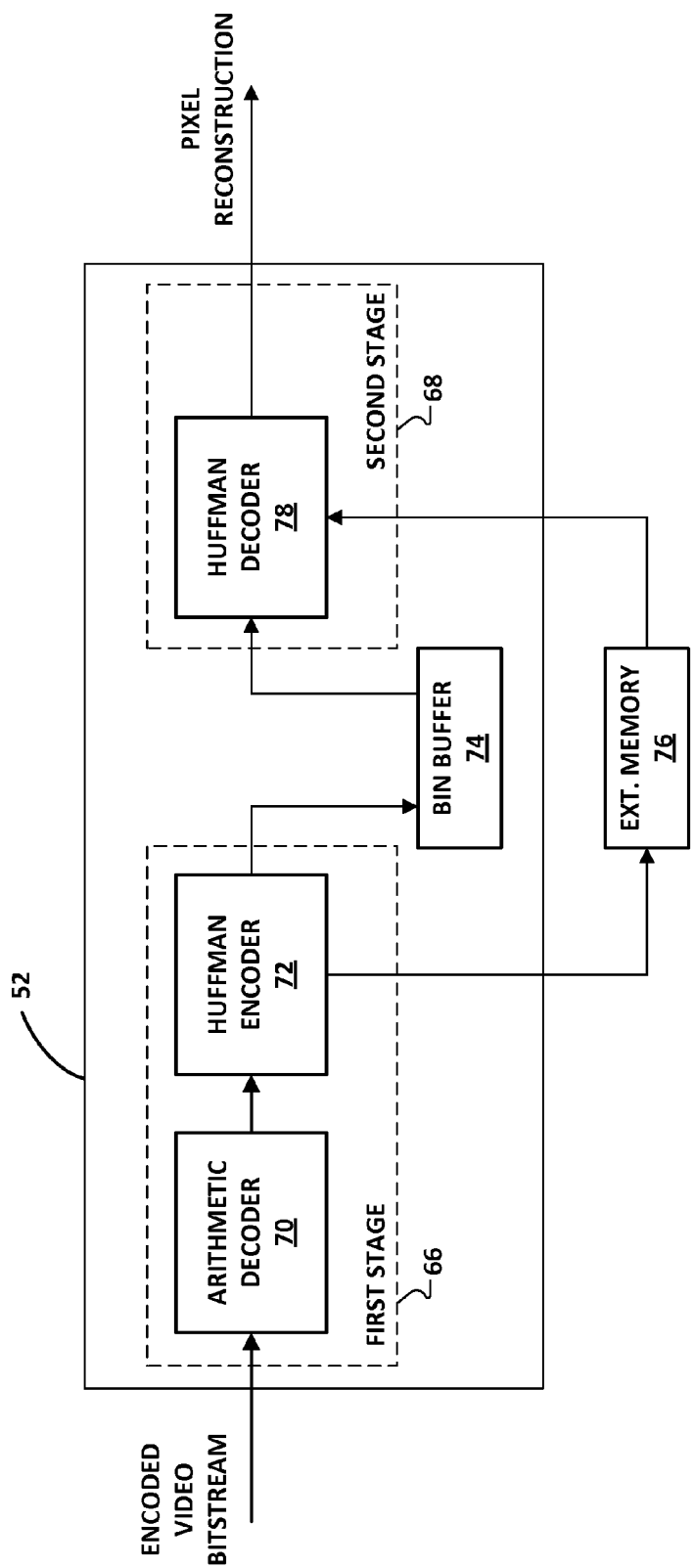
FIG. 4 is a block diagram illustrating an example of the entropy decoding unit of FIG. 3.

FIG. 4 is a block diagram illustrating an example of entropy decoding unit 52 of FIG. 3. Entropy decoding unit 52 may be included, for example, as part of a processor that performs the two-stage decoding techniques described herein. As shown in this example, entropy decoding unit 52 receives as input an encoded video bitstream, such as the encoded video bitstream from video encoder 50, and outputs data to be used for pixel reconstruction, as described above. As shown, entropy decoding unit 52 has a first stage 66 and a second stage 68 separated by a data store (e.g., either bin buffer 74 or external memory 76).

First stage 66 may include an arithmetic decoder 70 and a Huffman encoder 72. Arithmetic decoder 70 performs the inverse of the encoding technique performed by entropy encoding unit 46. As such, it is assumed in this example that entropy encoding unit 46 utilizes an arithmetic encoding technique to compress the video data. However, in other implementations, entropy encoding unit 46 may utilize another appropriate encoding technique, such as CAVLC or CABAC encoding, which would thereby change the type of decoder used in first stage 66. For example, if entropy encoding unit 46 utilizes a CAVLC encoding technique, then a CAVLC decoder would be used in first stage 66 in place of arithmetic decoder 70. Similarly, if entropy encoding unit 46 utilizes a CABAC encoding technique, then a CABAC decoder would be used in first stage 66 in place of arithmetic decoder 70. The output of arithmetic decoder 70 is generally in the format of variable-length compressed Boolean symbols.

Huffman encoder 72 is then used to re-encode the variable-length compressed Boolean symbols output from arithmetic decoder 70 using a different coding technique. In this example, the video data is re-encoded using a Huffman encoding technique to compress the video data, which reduces the amount of memory used to store the video data in the data store between the first and second stages. For example, in some implementations, the size of the video data may be reduced by a factor of approximately ten by using Huffman encoding to re-encode the video data before storing the data in on-chip bin buffer 74, or before sending the data off-chip for storage in external memory 76. In either case, the size reduction may be beneficial in terms of the amount of chip space required to store the data (in the case of on-chip bin buffer 74) or the amount of data to be transferred off-chip (in the case of external memory 76).

It should be understood that Huffman encoder 72 is provided as just one possible coding technique that may be used to re-compress the video data before being stored in the data store, but that other coding techniques are also possible. In some implementations, the coding technique used to re-encode the video data in first stage 66 may be selected to promote the desired trade-offs between coding performance and the amount of compression provided by the coding technique. For example, in some implementations, the coding technique may be selected such that the performance of the subsequent decoding in second stage 68 substantially matches the performance of the downstream pixel reconstruction processes.

Following re-encoding in first stage 66, the video data is sent to a data store between the first and second stages. In some implementations, the data store between the two stages includes a bin buffer 74, such as an on-chip memory. Bin buffer 74 may serve as a buffer to store the bins or binary symbols in the order they are decoded from the video bitstream. In other implementations, the data store includes an external memory 76 that is stored off-chip. As one example, external memory 76 may be shared device memory, such as synchronous dynamic random access memory (SDRAM), which is available for various other memory uses by the device. As another example, external memory 76 may be memory that is dedicated to entropy decoding unit 52. External memory 76 may be written to and accessed using a shared bus, or any other appropriate data transfer protocol. In some implementations, the data store between the first and second stages may include a combination of different data stores, e.g., a combination of bin buffer 74 and external memory 76, or any other appropriate combination of on-chip and/or off-chip storage mechanisms.

The data store between first stage 66 and second stage 68 may be sized appropriately to ensure that the second stage consistently has consumable data available, which in turn ensures that the second stage performance can substantially match the performance of the downstream pixel reconstruction processes. By utilizing the techniques described herein, the size of the data store may be reduced, for example, to less than or equal to approximately ten megabytes for video processing applications that support a frame rate of 60 frames per second at a resolution of 1080 p. A ten megabyte data store is smaller, and in some cases significantly smaller, than a buffer size that could accommodate similar amounts of video data assuming the data was not first compressed using the encoder in first stage 66. Similarly, the amount of data traffic between entropy decoding unit 52 and external memory 76 may also be reduced, and in some cases significantly reduced, in off-chip storage implementations, which correspondingly decreases the power requirements of the device.

Second stage 68 includes a Huffman decoder 78 that performs the inverse operation of Huffman encoder 72 in first stage 66. In other words, Huffman decoder 78 decompresses the video data into a useable format that is then provided to the downstream pixel reconstruction processes. As mentioned above, Huffman encoder 72 may be replaced by an encoder that utilizes a different type of coding technique, which would also change the type of decoder utilized in second stage 68. However, as described above, the type of decoder used in second stage 68 (and correspondingly the type of encoder used in first stage 66) may be selected such that the decoder's performance substantially matches the performance of the downstream pixel reconstruction processes.

Figure 5:
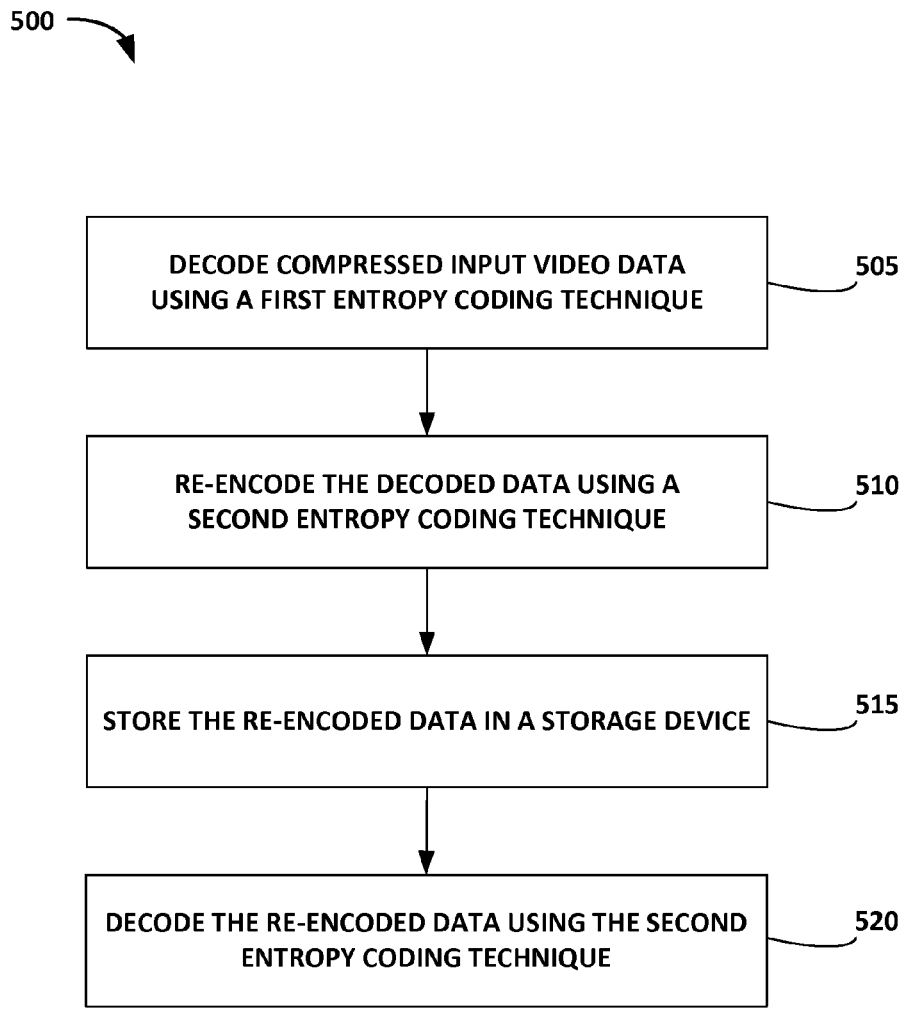
FIG. 5 is a flow diagram illustrating a two-stage entropy decoding technique consistent with this disclosure.

FIG. 5 is a flow diagram illustrating a two-stage entropy decoding technique 500 consistent with this disclosure. The actions described in the flow diagram may be performed, for example, by destination device 16, and in particular an entropy decoding unit, e.g., unit 52 of FIG. 3, that is included as part of video decoder 28 of destination device 16. For clarity of presentation, the description that follows uses entropy decoding unit 52 as the basis of an example for describing the technique. However, the example two-stage entropy decoding technique may alternatively be performed in another component or module, or in a combination of components and/or modules. Similarly, the technique may be performed by other devices or combinations of devices.

As shown in FIG. 5, the entropy decoding unit decodes compressed input video data using a first entropy coding technique (505). In some implementations, the first entropy coding technique is an arithmetic coding technique. The entropy decoding unit then re-encodes the decoded data using a second entropy coding technique that is different from the first entropy coding technique (510). In some implementations, the second entropy coding technique is a table-based entropy coding technique, such as Huffman encoding, for example. The decoding and re-encoding may be considered a part of a first stage of entropy decoding, according to this disclosure.

The entropy decoding unit then stores the re-encoded data in a storage device (515). In some implementations, the technique 500 may be performed by a processor, and the storage device may include memory that is external to the processor. In some implementations the storage device includes on-chip storage, off-chip storage, or a combination of on-chip and off-chip storage. For example, on-chip storage may be implemented as a bin buffer between the first stage and second stage of entropy decoding. As another example, off-chip storage may be implemented as an external, shared SDRAM memory component that is communicatively coupled to the on-chip processor by a shared data bus.

The entropy decoding unit then decodes the re-encoded data using the second entropy coding technique (520). The second decoding action may be considered a part of the second stage of entropy decoding, according to this disclosure. The decoded data may then be sent to downstream processes of the video decoder for further processing. For example, the further processing may include pixel reconstruction. In some implementations, the further processing of the decoded data may occur at a rate that substantially matches the rate of decoding the re-encoded data. In the case of further processing that includes pixel reconstruction, the rate of pixel reconstruction may substantially match the rate of decoding the re-encoded data using the second entropy coding technique.

The techniques of this disclosure may be embodied in a wide variety of devices or apparatuses, including a wireless handset, and integrated circuit (IC) or a set of ICs (i.e., a chip set). Any components, modules or units have been described provided to emphasize functional aspects and does not necessarily require realization by different hardware units, etc.

Accordingly, the techniques described herein may be implemented in hardware, software, firmware, or any combination thereof. Any features described as modules or components may be implemented together in an integrated logic device or separately as discrete but interoperable logic devices. If implemented in software, the techniques may be realized at least in part by a computer-readable medium comprising instructions that, when executed, performs one or more of the methods described above. The computer-readable data storage medium may comprise a tangible computer readable storage medium, and in some cases, may form part of a computer program product, which may include packaging materials. The computer-readable storage medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

The code may be executed by one or more processors, such as one or more digital signal processors (DSPs), general purpose microprocessors, an application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated software modules or hardware modules configured for encoding and decoding, or incorporated in a combined video encoder-decoder (CODEC). Also, the techniques could be fully implemented in one or more circuits or logic elements.

Various aspects of the disclosure have been described. These and other aspects are within the scope of the following claims.

What is claimed is:

1. A method of decoding video data comprising:
   decoding compressed input video data using an arithmetic coding technique to obtain first decoded data, wherein the arithmetic coding technique does not utilize Context Adaptive Binary Arithmetic Coding (CABAC), and wherein a first rate at which the input video data is decoded using the arithmetic coding technique is based on a bit rate of the input video data;
   re-encoding the first decoded data using a Huffman coding technique to obtain re-encoded data;
   storing the re-encoded data in a storage device;
   decoding the re-encoded data using the Huffman coding technique to obtain second decoded data, wherein a second rate at which the re-encoded data is decoded using the Huffman coding technique is based on the Huffman coding technique; and
   performing a pixel reconstruction process on the second decoded data, wherein a third rate at which the pixel reconstruction process is performed is based on a given resolution and a frame rate of the input video data, wherein the first rate at which the input video data is decoded using the arithmetic coding technique is different than the third rate at which the pixel reconstruction process is performed, and wherein the second rate at which the re-encoded data is decoded using the Huffman coding technique and the third rate at which the pixel reconstruction process is performed substantially match.

2. The method of claim 1, wherein the storage device comprises on-chip storage.

3. The method of claim 1, wherein the storage device comprises off-chip storage.

4. The method of claim 1, wherein the given resolution is 1080p and the frame rate is 60 frames per second.

5. The method of claim 2, wherein the on-chip storage device is less than or equal to ten megabytes.

6. A non-transitory computer-readable storage medium comprising instructions that, when executed, cause a processor to:
   decode compressed input video data using an arithmetic coding technique to obtain first decoded data, wherein the arithmetic coding technique does not utilize Context Adaptive Binary Arithmetic Coding (CABAC), and wherein a first rate at which the input video data is decoded using the arithmetic coding technique is based on a bit rate of the input video data;
   re-encode the first decoded data using a Huffman coding technique to obtain re-encoded data;
   store the re-encoded data in a storage device;
   decode the re-encoded data using the Huffman coding technique to obtain second decoded data, wherein a second rate at which the re-encoded data is decoded using the Huffman coding technique is based on the Huffman coding technique; and
   perform a pixel reconstruction process on the second decoded data, wherein a third rate at which the pixel reconstruction process is performed is based on a given resolution and a frame rate of the input video data, wherein the first rate at which the input video data is decoded using the arithmetic coding technique is different than the third rate at which the pixel reconstruction process is performed, and wherein the second rate at which the re-encoded data is decoded using the Huffman coding technique and the third rate at which the pixel reconstruction process is performed substantially match.

7. The non-transitory computer-readable storage medium of claim 6, wherein the storage device comprises on-chip storage.

8. The non-transitory computer-readable storage medium of claim 6, wherein the storage device comprises off-chip storage.

9. The non-transitory computer-readable storage medium of claim 6, wherein the given resolution is 1080p and the frame rate is 60 frames per second.

10. The non-transitory computer-readable storage medium of claim 7, wherein the on-chip storage device is less than or equal to ten megabytes.

11. An apparatus configured to decode video data, the apparatus comprising:
    a first entropy decoding unit that decodes compressed input video data using an arithmetic coding technique to obtain first decoded data, wherein the arithmetic coding technique does not utilize Context Adaptive Binary Arithmetic Coding (CABAC), and wherein a first rate at which the input video data is decoded using the arithmetic coding technique is based on a bit rate of the input video data;
    an entropy encoding unit that re-encodes the first decoded data using a Huffman coding technique to obtain re-encoded data;
    a storage device that stores the re-encoded data;
    a second entropy decoding unit that decodes the re-encoded data using the Huffman coding technique to obtain second decoded data, wherein a second rate at which the re-encoded data is decoded using the Huffman coding technique is based on the Huffman coding technique; and
    a data processing unit that performs a pixel reconstruction process on the second decoded data, wherein a third rate at which the pixel reconstruction process is performed is based on a given resolution and a frame rate of the input video data, wherein the first rate at which the input video data is decoded using the arithmetic coding technique is different than the third rate at which the pixel reconstruction process is performed, and wherein the second rate at which the re-encoded data is decoded using the Huffman coding technique and the third rate at which the pixel reconstruction process is performed substantially match.

12. The apparatus of claim 11, wherein the storage device comprises on-chip storage.

13. The apparatus of claim 11, wherein the storage device comprises off-chip storage.

14. The apparatus of claim 11, wherein the given resolution is 1080p and the frame rate is 60 frames per second.

15. The apparatus of claim 12, wherein the on-chip storage device is less than or equal to ten megabytes.

16. An apparatus that decodes video data, the device comprising:
  means for decoding compressed input video data using an arithmetic coding technique to obtain first decoded data, wherein the arithmetic coding technique does not utilize Context Adaptive Binary Arithmetic Coding (CABAC), and wherein a first rate at which the input video data is decoded using the arithmetic coding technique is based on a bit rate of the input video data;
  means for re-encoding the first decoded data using a Huffman coding technique to obtain re-encoded data;
  means for storing the re-encoded data in a storage device;
  means for decoding the re-encoded data using the Huffman coding technique to obtain second decoded data, wherein a second rate at which the re-encoded data is decoded using the Huffman coding technique is based on the Huffman coding technique; and
  means for performing a pixel reconstruction process on the second decoded data, wherein a third rate at which the pixel reconstruction process is performed is based on a given resolution and a frame rate of the input video data, wherein the first rate at which the input video data is decoded using the arithmetic coding technique is different than the third rate at which the pixel reconstruction process is performed, and wherein the second rate at which the re-encoded data is decoded using the Huffman coding technique and the third rate at which the pixel reconstruction process is performed substantially match.

17. The apparatus of claim 16, wherein the storage device comprises on-chip storage.

18. The apparatus of claim 16, wherein the storage device comprises off-chip storage.

19. The apparatus of claim 16, wherein the given resolution is 1080p and the frame rate is 60 frames per second.

20. The apparatus of claim 17, wherein the on-chip storage device is less than or equal to ten megabytes.

* * * * *